(12) United States Patent
Hurlin et al.

(10) Patent No.: US 9,243,587 B2
(45) Date of Patent: Jan. 26, 2016

(54) NACELLE FOR AN AIRCRAFT BYPASS TURBOJET ENGINE

(75) Inventors: Herve Hurlin, Igny (FR); Olivier Kerbler, Courbevoie (FR); Olivier Gilo, Versailles (FR)

(73) Assignee: AIRCELLE, Gonfreville l'Orcher (FR)

( * ) Notice: Subject to any disclaimer, the term of this patent is extended or adjusted under 35 U.S.C. 154(b) by 331 days.

(21) Appl. No.: 13/640,119

(22) PCT Filed: Oct. 28, 2011

(86) PCT No.: PCT/FR2011/052543
§ 371 (c)(1),
(2), (4) Date: Oct. 9, 2012

(87) PCT Pub. No.: WO2012/066210
PCT Pub. Date: May 24, 2012

(65) Prior Publication Data
US 2013/0230391 A1    Sep. 5, 2013

(30) Foreign Application Priority Data

Nov. 16, 2010 (FR) ...................................... 10 59393

(51) Int. Cl.
*F02K 1/12*    (2006.01)
*B64D 33/04*   (2006.01)
*F02K 1/76*    (2006.01)
*F01D 25/24*   (2006.01)

(52) U.S. Cl.
CPC ............... *F02K 1/123* (2013.01); *B64D 33/04* (2013.01); *F01D 25/24* (2013.01); *F02K 1/12* (2013.01); *F02K 1/763* (2013.01)

(58) Field of Classification Search
CPC ......... B64D 33/04; F01D 25/24; F02K 1/123; F02K 1/763; F02K 1/1269–1/1292

USPC ........................... 239/265.33–265.41; 60/771
See application file for complete search history.

(56) References Cited

U.S. PATENT DOCUMENTS

| 2,779,157 | A | * | 1/1957 | Palmer .................... 239/265.37 |
| 2,791,882 | A | * | 5/1957 | Willard .................... 239/265.37 |
| 3,892,358 | A | * | 7/1975 | Gisslen .................... 239/265.39 |
| 3,972,475 | A | * | 8/1976 | Nelson et al. .................. 60/771 |

(Continued)

FOREIGN PATENT DOCUMENTS

EP    0488453 A1    6/1992

OTHER PUBLICATIONS

International Search Report issued Jul. 8, 2012 re: PCT/FR2011/052543, U.S. Pat. No. 5,806,302 A, EP 0 488 453 A.

*Primary Examiner* — Ted Kim
(74) *Attorney, Agent, or Firm* — Brinks Gilson & Lione

(57) ABSTRACT

The invention relates to a nacelle (1) for an aircraft bypass turbojet engine comprising, in downstream cross section, an inner fixed structure (8) intended to surround part of the bypass turbojet engine and an outer structure (9) at least partially surrounding the inner fixed structure (8) so as to delimit an annular flow path (10), the outer structure (9) comprising at least one inner flap (101) positioned facing the annular flow path (10), an outer flap (103) not in contact with the annular flow path (10) at least partially surmounting each inner flap (101) in aerodynamic continuity with the rest of the outer structure (9), and an intermediate flap (105) positioned between each inner flap (101) and each outer flap (103), said intermediate flap (105) being capable of translational movement so as to increase or decrease the cross section of the annular flow path (10), and each inner flap (101) and each outer flap (103) being capable of rotational movement so as to remain in permanent contact with the intermediate flap (105) in all positions of the latter.

9 Claims, 4 Drawing Sheets

(56) References Cited

U.S. PATENT DOCUMENTS

| | | | | |
|---|---|---|---|---|
| 3,988,889 A | * | 11/1976 | Chamay et al. | 239/265.39 |
| 5,211,008 A | * | 5/1993 | Fage | 60/771 |
| 5,806,302 A | * | 9/1998 | Cariola et al. | 60/771 |
| 7,475,547 B2 | * | 1/2009 | Blanchard et al. | 60/771 |

* cited by examiner

NACELLE FOR AN AIRCRAFT BYPASS TURBOJET ENGINE

TECHNICAL FIELD

The invention relates to a nacelle for a bypass turbojet engine of an aircraft comprising in the downstream cross-section, an inner fixed structure intended to surround a portion of the bypass turbojet engine and an outer structure at least partly surrounding the inner fixed structure so as to delimit an annular flow path.

BRIEF DISCUSSION OF RELATED ART

An aircraft is driven by several turbojet engines each housed in a nacelle also harboring a set of ancillary actuation devices related to its operation and providing various functions when the turbojet engine is operating or at a standstill. These ancillary actuation devices notably comprise a thrust reversal mechanical actuation system.

A nacelle generally has a tubular structure along a longitudinal axis comprising an air intake upstream from the turbojet engine, a middle cross-section intended to surround a fan of the turbojet engine, a downstream cross-section harboring thrust reversal means and intended to surround the combustion chamber of the turbojet engine. The tubular structure generally ends with an injection nozzle, the outlet of which is located downstream from the turbojet engine.

Modern nacelles are intended to harbor a bypass turbojet engine capable of generating, via the rotating blades of the fan, a hot airflow (also called <<primary flow>>) from the combustion chamber of the turbojet engine, and a cold air flow (<<secondary flow>>) which circulates outside the turbojet engine through an annular passage, also called <<an annular flow path>>.

By the term of <<downstream>> is meant here the direction corresponding to the direction of the cold air flow penetrating into the turbojet engine. The term of <<upstream>> designates the opposite direction.

Said annular flow path is formed in a downstream cross-section by an outer structure, a so-called outer fixed structure (OFS) and a concentric inner structure, a so-called inner fixed structure (IFS), surrounding the structure of the engine strictly speaking downstream from the fan. The inner and outer structures belong to the downstream cross-section. The outer structure may include one or several cowls sliding along the longitudinal axis of the nacelle between a position allowing escape of the reversed air flow and a position preventing such an escape.

Usually, the variable nozzle is formed with mobile sliding elements and configured so as to allow a decrease in the ejection cross-section of the airflow at the outlet of the annular flow path in order to optimize the cross-section of the latter according to the flight phase in which the aircraft is found.

However, said mobile elements do not give the possibility of obtaining good aerodynamic quality of the secondary flow path. Poor aerodynamic quality causes an increase in the specific consumption and in the noise of the propulsion system comprising the turbojet engine and the nacelle.

BRIEF SUMMARY

A nacelle is provided, the cross-section of which for ejecting the cold air flow is variable by means which do not have the aforementioned drawbacks.

For this purpose, according to a first aspect, a nacelle is provided for a bypass turbojet engine of an aircraft comprising in a downstream cross-section, a fixed inner structure intended to surround a portion of the bypass turbojet engine and an outer structure surrounding at least partly the inner fixed structure so as to delimit an annular flow path, the outer structure comprising at least one inner flap positioned facing the annular flow path, an outer flap not in contact with the annular flow path at least partly surmounting each inner flap in aerodynamic continuity with the remainder of the outer structure, as well as an intermediate flap positioned between each inner flap and each outer flap, said intermediate flap being translationally mobile so as to enlarge or decrease the cross-section of the annular flow path, and each inner flap and each outer flap being rotationally mobile so as to remain in permanent contact with the intermediate flap in all the positions of the latter.

Each intermediate flap is mounted inside the outer structure between an inner flap and an outer flap. The intermediate flap may be deployed between a rated position corresponding to the normal operating position of the nacelle, a deployed position corresponding to the position enlarging the cross-section of the annular flow path and a retracted position corresponding to the position decreasing the cross-section of the annular flow path. During all the positions and the passing from the latter, the outer flap remains in permanent contact with the intermediate flap.

The combination of the intermediate and outer mobile flaps while remaining in permanent contact with each other allows the outlet cross-section of the ejection nozzle to be varied by causing a development in the shape of the trailing edge of the downstream portion of the outer structure of the secondary flow path. The secondary flow path then has very good aerodynamic quality.

According to other features of the invention, the nacelle of the invention includes one or several of the following optional features considered alone or according to all possible combinations:

- at least one intermediate flap is translationally mobile by means of a slide or rollers cooperating with a system of rails belonging to a frame supporting said intermediate flap which allows displacement of each intermediate flap in a simple and reliable way;
- at least one intermediate flap is set into motion by one or several electric or hydraulic actuation cylinders with which each intermediate flap may be set into motion in a simple and efficient way;
- the frame associated with an intermediate flap is mobile relatively to the outer structure which allows the whole intermediate flap to be driven and a decrease in the force to which the frame is subject;
- the frame is translationally mobile by means of one or several actuation cylinders along an axis substantially collinear with a longitudinal axis of the nacelle and the translation movement is transmitted to the intermediate flap through a system of connecting rods;
- the frame is rotationally mobile by means of one or several actuation cylinders around an axis substantially collinear with a longitudinal axis of the nacelle and the movement is transmitted to the intermediate flap via a jointed system, notably one or several crank assemblies;
- each inner flap and each outer flap is in permanent contact with the intermediate flap by means of a system of rails or of a spring system which allows permanent and reliable contact of the intermediate flap with the outer and inner flaps;

each inner flap, each outer flap and each intermediate flap include contact surfaces coated with an anti-friction coating with which it is possible to avoid wear of the flaps.

BRIEF DESCRIPTION OF THE DRAWINGS

The invention will be further understood by reading the non-limiting description which follows, made with reference to the figures appended herein.

DETAILED DESCRIPTION

Figure 1:
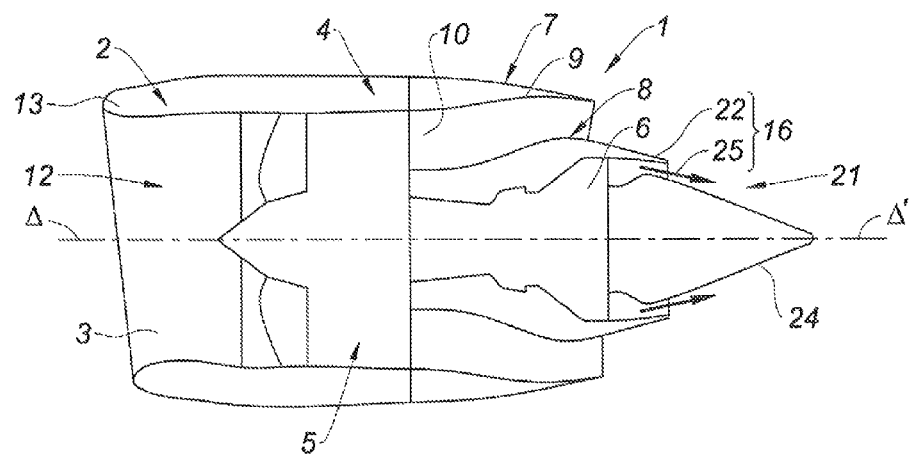
FIG. 1 is a partial schematic sectional view of an embodiment of a nacelle of the invention.

As illustrated in FIG. 1, a nacelle according to the invention has a substantially tubular shape along a longitudinal axis Δ. The nacelle of the invention 1 comprises an upstream cross-section 2 with an air intake lip 13 forming an air intake 3, a middle cross-section 4 surrounding a fan 5 of a turbojet engine 6 and a downstream cross-section 7. The downstream cross-section 7 comprises an inner structure 8 (generally called <<IFS>>) surrounding the upstream portion of the turbojet engine 6, an outer structure (OFS) 9 which may support a mobile cowl including thrust reversal means.

The IFS 8 and the OFS 9 delimit an annular flow path 10 allowing the passing of an air flow 12 penetrating the nacelle 1 of the invention at the air intake 3.

The nacelle 1 of the invention ends with an injection nozzle 21 comprising an outer module 22 and an inner module 24. The inner 24 and outer 22 modules define a channel for draining a hot air flow 25 flowing out of the turbojet engine 6.

Figure 2:
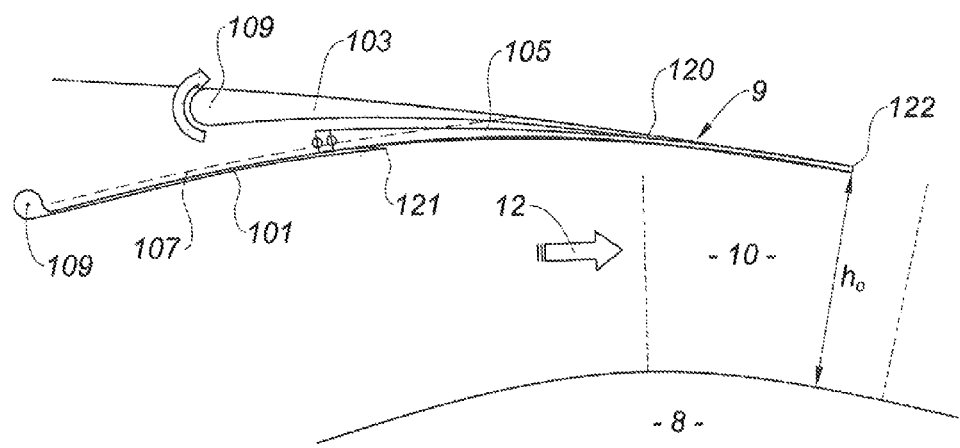
FIG. 2 is a schematic longitudinal sectional view of a downstream cross-section of an embodiment of a nacelle of the invention in which the inner, outer and intermediate flaps are in a rated position.

As illustrated in FIG. 2, the OFS 9 comprises at least one inner flap 101 positioned facing the annular flow path 10, an outer flap 103 not in contact with the annular flow path 10 at least partly surmounting each inner flap 101 in aerodynamic continuity with the remainder of the OFS 9. An intermediate flap 105 is positioned between each inner flap 101 and each outer flap 103. Said intermediate flap 105 is translationally mobile so as to enlarge or decrease the cross-section of the annular flow path 10. Further, the outer flap 103 and the inner flap 101 which is associated with it, are rotationally mobile so as to remain in permanent contact with the intermediate flap 105 in all the positions of the latter.

Typically, the nacelle 1 of the invention includes as many inner flaps 101 than there are outer flaps 103 and intermediate flaps 105. The nacelle 1 of the invention may thus include a plurality of inner flaps 101 each associated with an outer flap 103 and with an intermediate flap 105. The flaps 101, 103, and 105 are distributed on the circumference of said nacelle 1.

Each outer flap 103 pivots around a fixed pivot axis 109 relatively to the OFS 9, said pivot axis 109 being contained in a radial plane substantially perpendicular to the axis Δ of the nacelle 1 of the invention.

Each inner flap 101 pivots relatively to the OFS 9 around an axis substantially collinear with the pivot axis 109 of the outer flap.

Figure 5:
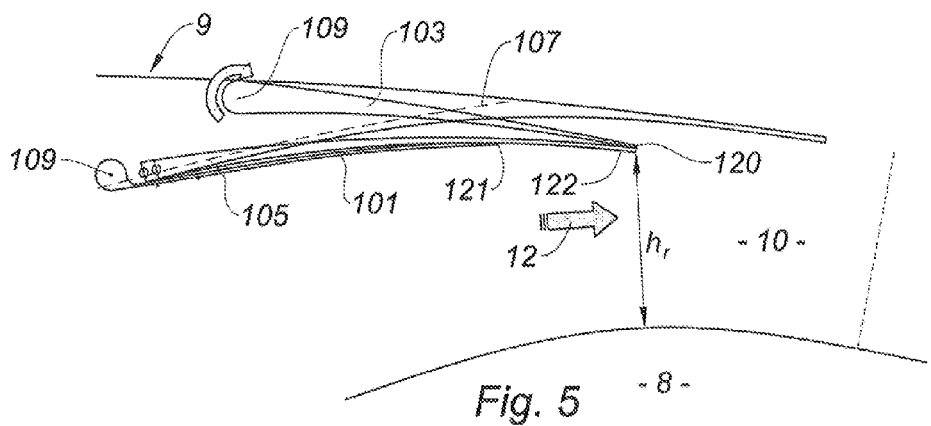
FIG. 5 is a schematic longitudinal sectional view of a downstream cross-section of an embodiment of a nacelle of the invention, in which the inner, outer and intermediate flaps are in the retracted position.
Figure 8:
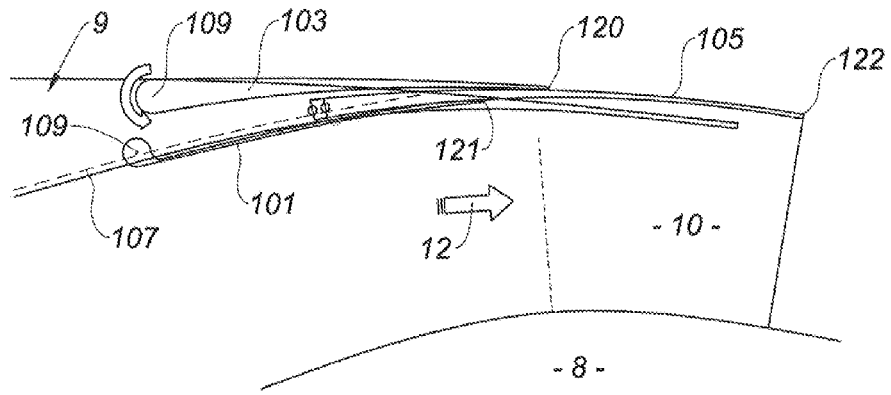
FIG. 8 is a schematic longitudinal sectional view of a downstream cross-section of an embodiment of a nacelle of the invention, in which the inner, outer and intermediate flaps are in the deployed position.

Each intermediate flap 105 is mobile along a trajectory indicated in dotted lines 107 in FIGS. 2, 5 and 8. Typically, said trajectory 107 of the intermediate flap is substantially collinear with the longitudinal direction of the annular flow path 10. By <<longitudinal direction>>, is meant here, the direction substantially collinear with the IFS 8 when the latter widens from upstream to downstream as far as the widest area of the IFS 8.

Figure 9:
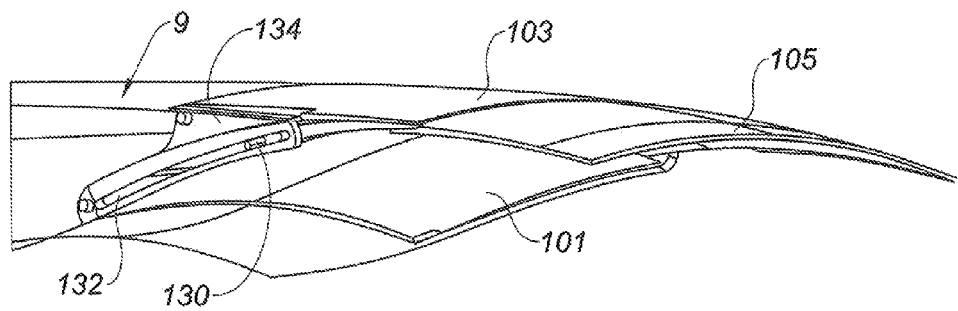
FIG. 9 is a perspective view of the embodiment of FIG. 8.
Figure 10:
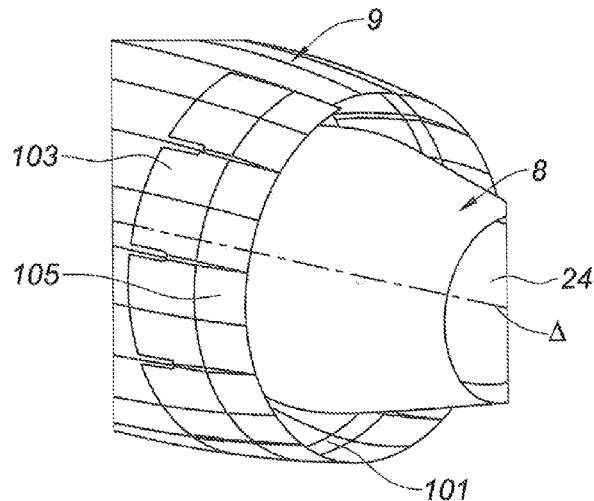
FIG. 10 is a perspective view of the rear of the nacelle according to the embodiment of FIG. 8.
Figure 11:
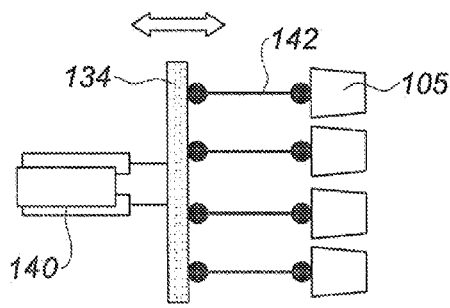
FIG. 11 is a schematic sectional view of an embodiment of the actuation of the intermediate flap of the nacelle according to the invention.
Figure 12:
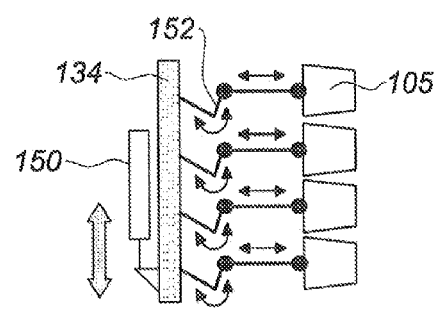
FIG. 12 is a schematic sectional view of an alternative embodiment of FIG. 11.

Each intermediate flap 105 may be deployed between a rated position (FIGS. 2 to 4) corresponding to the normal operating position of the nacelle 1 of the invention, a deployed position corresponding to the position enlarging the cross-section of the annular flow path 10 (see FIGS. 5 to 7) and a retracted position corresponding to the position decreasing the cross-section of the annular flow path 10 (see FIGS. 8 to 10). During all the positions and the passing from one to the other positions, each outer flap 103 remains in permanent contact with the intermediate flap 105 which is associated with it.

The combination of the intermediate 105, inner 101 and outer 103 mobile flaps while remaining in permanent contact with each other, allows the outlet cross-section of the ejection nozzle to be varied by causing a development in the shape of the trailing edge of the downstream portion of the OFS 9 of the secondary flow path. The secondary flow path 10 then has very good aerodynamic quality which allows improvement in the specific consumption and a decrease in the noise generated by the propulsion system comprising the turbojet engine 6 and the nacelle 1 of the invention.

Figure 3:
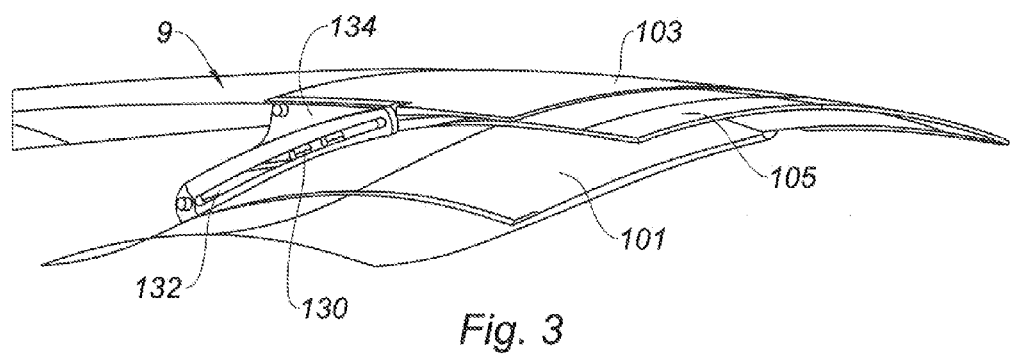
FIG. 3 is a perspective view of the embodiment of FIG. 2.
Figure 4:
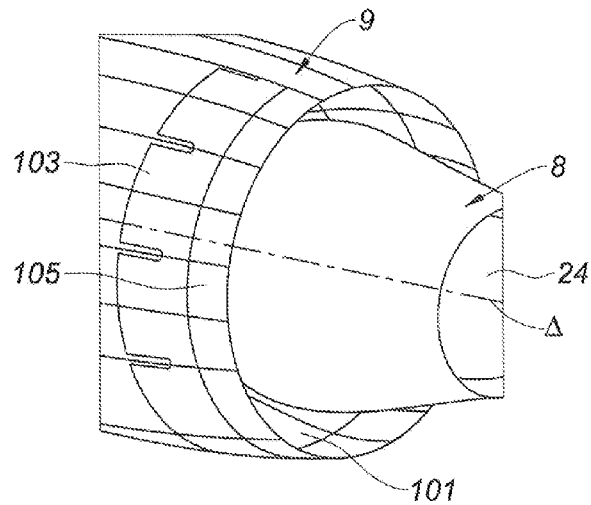
FIG. 4 is a perspective view of the rear of the nacelle according to the embodiment of FIG. 2.

As illustrated in FIGS. 2 to 4, the intermediate flap 105 is in a rated position corresponding to the configuration of the downstream cross-section of the OFS 9 when the nacelle 1 of the invention is in a cruising position, i.e. not during landing, take-off or an acceleration phase.

In this position, the outer flap 103 and the inner flap 101 lie at their free end 120 on the surface of the intermediate flap 105, at a distance from the free end 122 of said intermediate flap 105.

In this rated position, the cross-section of the annular flow path 10 has a rated height $h_0$.

Figure 6:
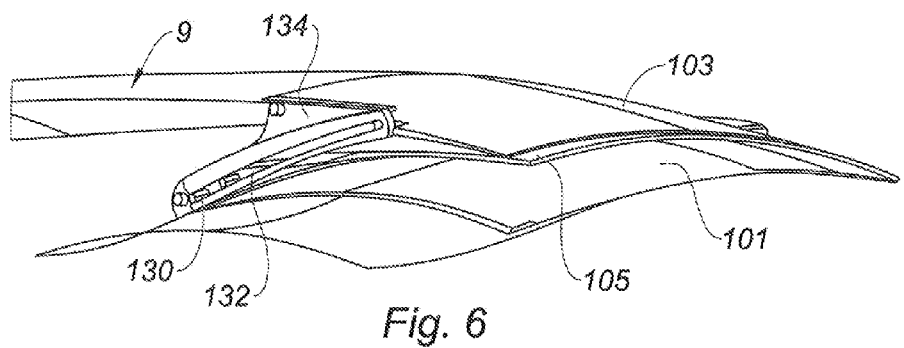
FIG. 6 is a perspective view of the embodiment of FIG. 5.
Figure 7:
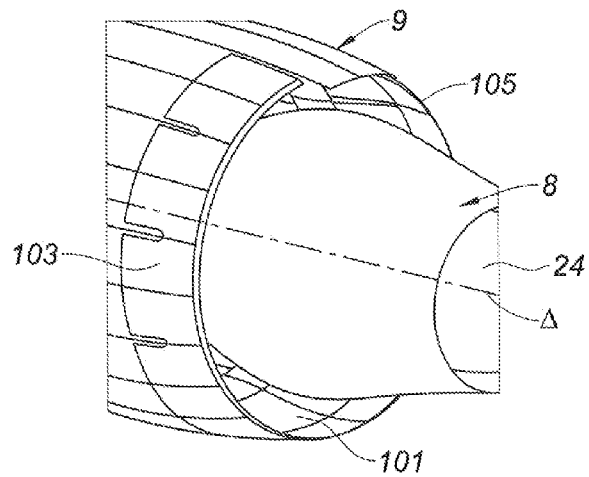
FIG. 7 is a perspective view of the rear of the nacelle according to the embodiment of FIG. 5.

As illustrated in FIGS. 5 to 7, the intermediate flap 105 is in a retracted position corresponding to the configuration for decreasing the cross-section of the annular flow path 10. In other words, the transverse height $h_r$ of the annular flow path 10 is smaller than the rated height $h_0$. This position corresponds to the configuration in which the propulsion system generates a low thrust, notably when the aircraft is in descent.

In this position, the outer flap 103 and the inner flap 101 rest at their free end 120 and 121 on the surface of the intermediate flap 105, in proximity to or on the free end 122 of said intermediate flap 105.

To do this, the outer flap 103 and the inner flap 101 pivot around their axis 109 concomitantly with the downstream displacement of the intermediate flap 105 out of the OFS 9.

As illustrated in FIGS. 8 to 10, the intermediate flap 105 is in a deployed position corresponding to the configuration for increasing the cross-section of the annular flow path 10. In other words, the transverse height $h_r$ of the annular flow path 10 is greater than the rated height $h_0$. This position corresponds to the configuration in which the nacelle 1 of the invention has an outlet cross-section of the annular flow path 10 which is maximum corresponding to a strong thrust from the propulsion system, notably during take-off.

In this position, the outer flap 103 and the inner flap 101 rest at their free end 120 and 121 on the surface of the intermediate flap 105, at a long distance from the free end 122 of said intermediate flap.

As earlier, the outer flap 103 and the inner flap 101 pivot around their axis 109 concomitantly with the upstream displacement of the intermediate flap 105 towards the inside of the OFS 9.

The intermediate flap 105 may be translationally mobile by means of a slide 130 or rollers cooperating with a system of rails 132 belonging to a frame 134 supporting said intermediate flap 105 which allows each intermediate flap 105 to be displaced simply and reliably (see FIGS. 3, 6 and 9). Typically, the rail has a direction substantially collinear with the trajectory 107 of the intermediate flap. Thus, the position of the slide or of the roller in the rail allows the intermediate flap 105 to advance or the latter to move back along the trajectory 107.

The frame 134 of the intermediate flap may be attached onto the OFS 9, in particular on a fixed flap 101.

The intermediate flap 105 may be or is set into motion in a simple and efficient way and autonomously by one or several electric or hydraulic actuation cylinders (not shown).

The frame 134 associated with one or the intermediate flaps 105 may also be mobile relatively to the OFS 9 by which it is possible to drive said intermediate flap 105 or all of them.

In this perspective, the frame 134 may be translationally mobile by means of one or several actuation cylinders 140 along an axis substantially collinear to a longitudinal axis Δ of the nacelle 1 of the invention and the translational movement is transmitted to the associated transmitted flap 105 by a system of connecting rods 142.

In an alternative, the frame 134 may be rotationally mobile by means of one or several actuation cylinders 150 around an axis substantially collinear with a longitudinal axis Δ of the nacelle 1 of the invention and the movement is transmitted to the associated intermediate flap 105 via a jointed system, notably one or several crank systems 152.

Each inner flap 101 and each outer flap 103 is in permanent contact with the associated intermediate flap 105 via a system of rails or a spring system (not shown) which allows permanent and reliable contact of the intermediate flap with the inner and outer flaps. A means for ensuring the permanent contact of said inner 101 and outer 103 mobile flaps with the intermediate flap 105 may be the installation of one or several springs of the torsional bar type in the joint of each inner 101 and outer 103 rotationally mobile flaps. Said springs generate strong continuous pressure of the inner flaps 101 and outer flaps 103 on the intermediate flap 105.

The inner flap 101, the outer flap 103 and the intermediate flap 105 may include surfaces in contact, coated with an anti-friction coating with which it is possible to avoid wear of both flaps 105 and 103. As an example of an anti-friction coating, mention may be made of PTFE (called <<Teflon>>) or the like.

Thus, in the rated position, the cross-section of the annular flow path 10 has a height $h_0$ allowed by the position of each intermediate flap 105, the free end 122 of which exceeds that of the inner 101 and outer 103 flaps which are associated with it. When it is necessary to increase the height $h_r$ relatively to the rated height $h_0$, the intermediate flap 105 is set into motion along the trajectory 107 downstream from the flaps 101 and 103 so that the free end 122 further exceeds that of the inner 101 and outer 103 flaps which are associated with it. Each intermediate flap 105 is therefore in a deployed position.

If, on the contrary it is necessary to reduce the height $h_r$ relatively to the rated height $h_0$, the intermediate flap 105 is set into motion along the trajectory 107 upstream from the flaps 101 and 103 towards the inside of the OFS 9 so that the free end 122 is in proximity to or under that of the outer flap 103 which is associated with it. Each intermediate flap 105 is therefore in a retracted position.

Of course, the features described within the scope of the embodiments described above may be taken individually or combined together without departing from the scope of the present invention.

The invention claimed is:

1. A nacelle for a bypass turbojet engine of an aircraft comprising:
   in a downstream cross-section an inner fixed structure surrounding one portion of the bypass turbojet engine; and
   an outer structure at least partly surrounding the inner fixed structure so as to delimit an annular flow path,
   the outer structure comprising:
      at least one inner flap positioned facing the annular flow path,
      an outer flap not in contact with the annular flow path and at least partly on top of each inner flap in aerodynamic continuity with a remainder of the outer structure, and
      an intermediate flap positioned between each inner flap and each outer flap,
   said intermediate flap configured to translate by actuating means for translating said intermediate flap along a longitudinal direction of the annular flow path by which a free end of said intermediate flap moves downstream further than free ends of the inner and outer flaps in a deployed position, the translation of said intermediate flap configured to enlarge the cross-section of the annular flow path in the deployed position and decrease the cross-section of the annular flow path in a retracted position, and
   each inner flap and each outer flap being rotationally mobile and configured to remain in permanent contact with the intermediate flap in all positions of the intermediate flap.

2. The nacelle according to claim 1, wherein said actuating means for translating said intermediate flap comprises a slide or rollers cooperating with a system of rails belonging to a frame supporting said intermediate flap.

3. The nacelle according to claim 1, wherein said actuating means for translating said intermediate flap comprises one or several electric or hydraulic actuation cylinders.

4. The nacelle according to claim 1, wherein a frame associated with said intermediate flap is mobile relatively to the outer structure.

5. The nacelle according to claim 4, wherein the frame is translationally mobile by means of one or several actuation cylinders along an axis substantially collinear with a longitudinal axis of the nacelle and the translational movement is transmitted to the intermediate flap by a system of connecting rods.

6. The nacelle according to claim 4, wherein the frame is rotationally mobile by means of one or several actuation cylinders around an axis substantially collinear with a longitudinal axis of the nacelle and the movement is transmitted to the intermediate flap via a jointed system.

7. The nacelle according to claim 6, wherein the jointed system includes one or several crank systems.

8. The nacelle according to claim 1, wherein each inner flap and each outer flap is in permanent contact with the intermediate flap by means of a system of rails or a spring system.

9. The nacelle according to claim 1, wherein each inner flap, each outer flap and each intermediate flap include surfaces in contact, coated with an anti-friction coating.

* * * * *